United States Patent [19]

Bowden

[11] Patent Number: 4,856,409
[45] Date of Patent: Aug. 15, 1989

[54] MISSILES AND LAUNCHER APPARATUS THEREFOR

[75] Inventor: Raymond F. Bowden, Hatfield, England

[73] Assignee: British Aerospace Public Limited Company, London, England

[21] Appl. No.: 236,937

[22] Filed: Aug. 26, 1988

[30] Foreign Application Priority Data

Nov. 18, 1986 [GB] United Kingdom ............... 8627530
Nov. 18, 1987 [EP] European Pat. Off. .......... 873101935

[51] Int. Cl.$^4$ .................... F41F 3/04; F41F 3/052; F41F 3/06
[52] U.S. Cl. ..................................... 89/1.819; 89/1.8; 89/1.806
[58] Field of Search ................ 89/1.819, 1.806, 1.53, 89/1.58, 1.8, 1.51

[56] References Cited

U.S. PATENT DOCUMENTS

| | | | |
|---|---|---|---|
| 3,115,059 | 12/1963 | Moul | 89/1.819 |
| 3,146,670 | 9/1964 | Suydam | 89/1.819 |
| 3,153,980 | 10/1964 | Kongelbeck | 89/1.819 |
| 3,195,406 | 7/1965 | Toomey | 89/1.819 |
| 3,431,824 | 3/1969 | Damm | 89/1.51 |
| 3,967,529 | 7/1976 | Ingle et al. | 89/1.8 |
| 4,352,314 | 10/1982 | Engel et al. | 89/1.57 |
| 4,392,411 | 7/1983 | Minkler | 89/1.806 |

Primary Examiner—David H. Brown
Attorney, Agent, or Firm—Cushman, Darby & Cushman

[57] ABSTRACT

A missile with upstanding hook members for engaging a slideway forming part of a launch station for the missile, e.g. beneath an aircraft, is fitted with a sub-frame incorporating ram and cutter knife assemblies for severing the hook members from the missile as it is launched leaving the missile with a better aerodynamic shape.

10 Claims, 5 Drawing Sheets

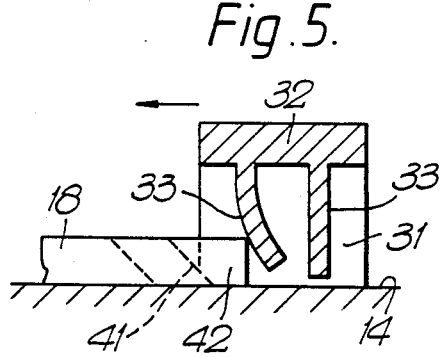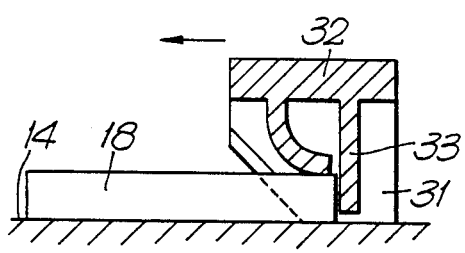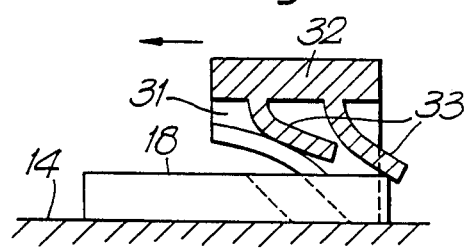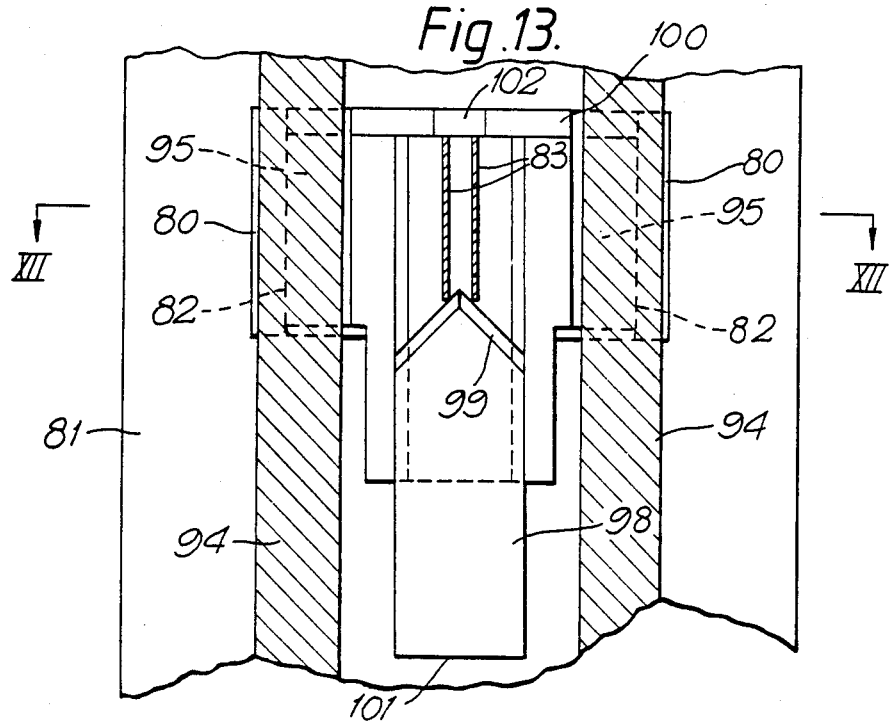

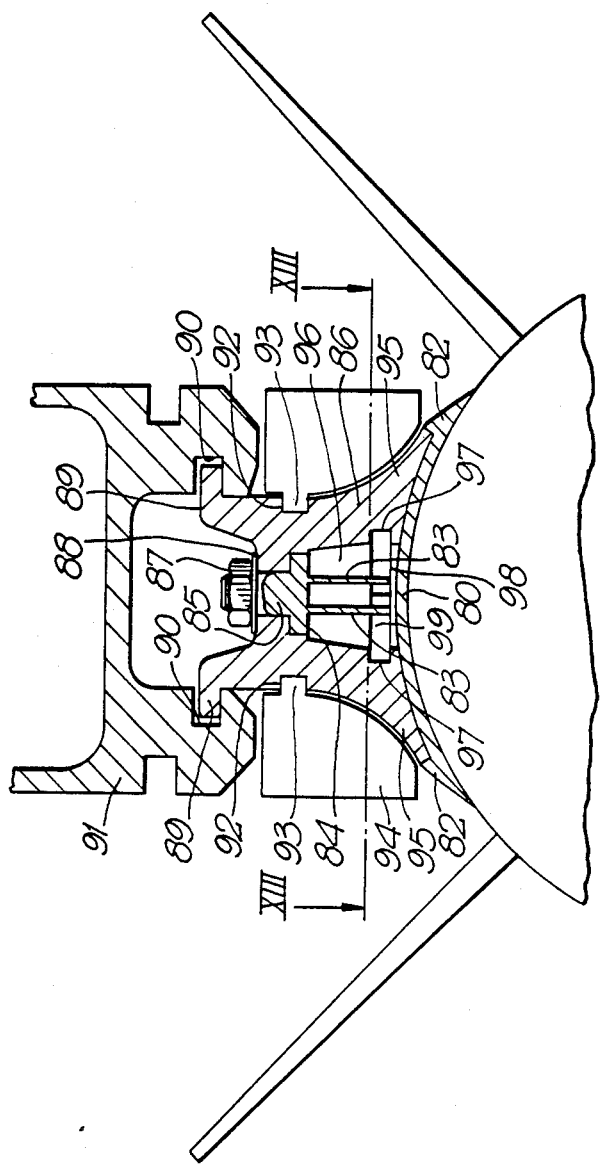

MISSILES AND LAUNCHER APPARATUS THEREFOR

BACKGROUND

This invention relates to missiles and launcher apparatus therefor.

Some air-launched missiles, particularly a certain widely used missile, is provided with a series of upstanding slideway engaging members called 'hooks' which, to fit the missile to an aircraft, are engaged with a slide rail forming part of a missile launcher station of the aircraft. On launch, the missile goes forward with the hooks sliding along the slide rail until they emerge one after another from the front thereof. Thereby the missile is released from the aircraft and continues off on its mission. The hooks remain fixed to and upstanding from the missile body.

To achieve good performance, modern missiles are designed so as to have very smooth low drag aerodynamic characteristics. The presence of upstanding hooks fixed to the missile in order to allow it to be fitted to the above described form of launcher station (which is desirable since, as noted, it is widely used), then becomes very significant as a factor reducing performance.

U.S. Pat. No. 4,352,314 is also concerned with the above problem and, for its alleviation, suggests the use of a missile to aircraft coupling head which is engaged in a socket-like recess in the missile wall and held there by a spring loaded key-bolt. When the missile has been released from the aircraft, the key-bolt is withdrawn from engagement with the coupling head and the latter is then ejected from the recess by an explosive charge. The key-bolt, the mechanism for withdrawing it from engagement with the coupling head, and the explosive charge for ejecting the head all have to be provided within the missile's body.

OBJECT

Accordingly it is an object of the invention to provide an alternative missile mounting arrangement which makes use of slide rail engaging hooks and hence can be fitted to already available aircraft launcher stations but in which the hooks are left behind rather than on the missile where they affect its performance.

A further object is to provide such a mounting arrangement in which the various parts are external to the missile, i.e. without any interlocking mechanism, disengagement mechanism or ejecting means mounted inside the missile body.

SUMMARY OF THE INVENTION

According to one aspect of the invention, there is provided a missile having at least one hook attached to the missile body and operable for engaging a slider rail forming part of a launch station for the missile, cutter knife means positioned in front of the hook and moveable relative to the missile towards said hook, and abutment means for engaging said cutter knife means as the missile is launched and for causing the cutter knife means to forcibly engage and sever the hook from the missile at a position adjacent the missile body.

LIST OF THE DRAWINGS

For a better understanding of the invention, reference will be made, by way of example, to the accompanying drawings, in which:

FIGS. 5, 6 and 7 are sketches of part of the hook and hook cutting assembly showing respective stages in its operation;

DESCRIPTION

Figure 1:
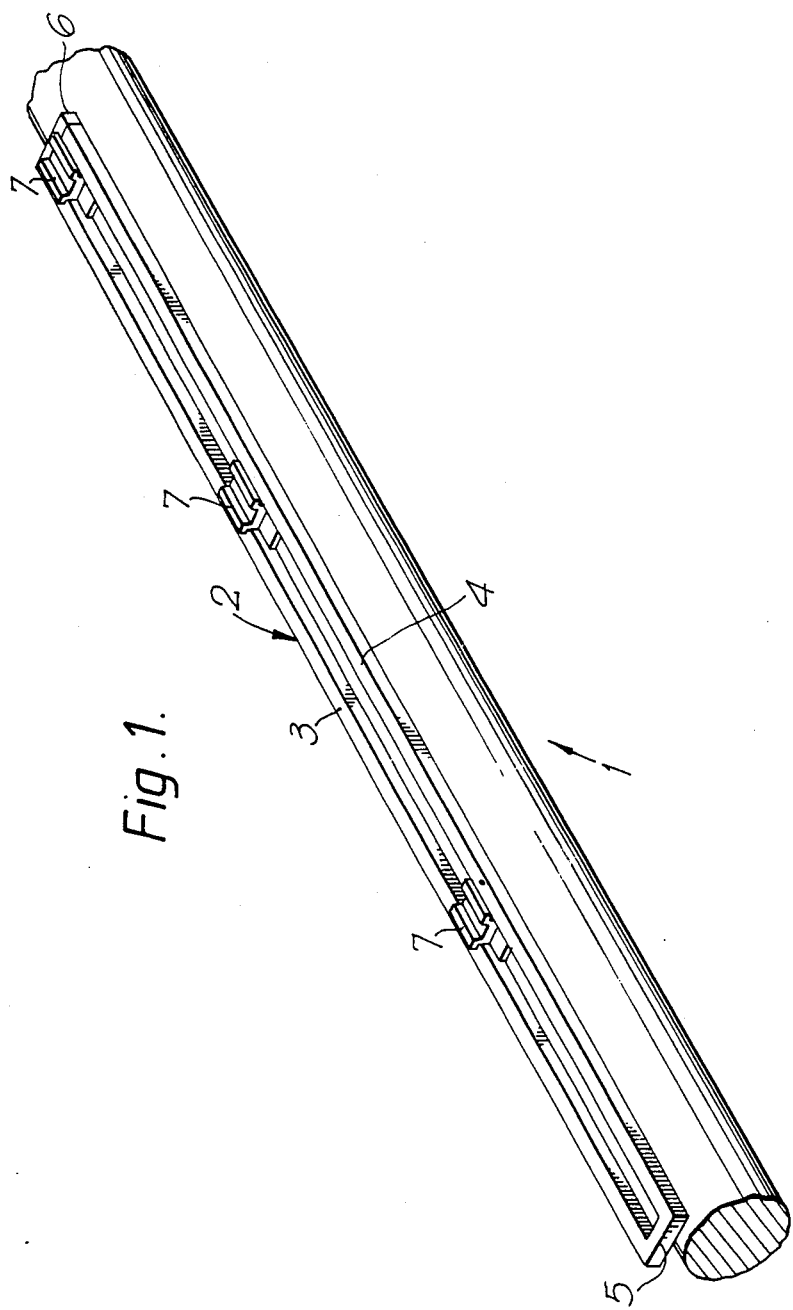
FIG. 1 is a perspective view of part of an air-launched missile and auxiliary mounting frame.
Figure 2:
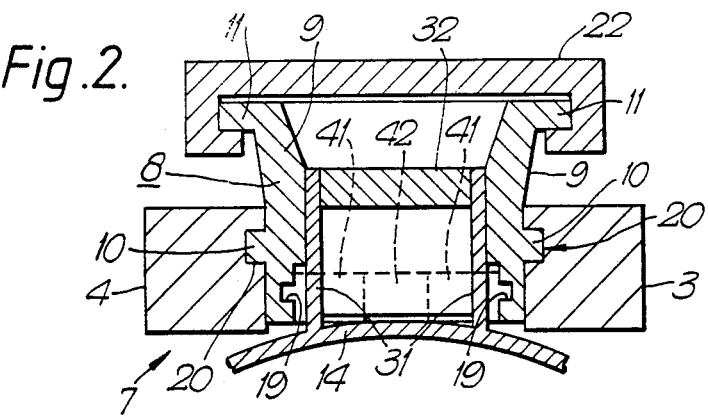
FIG. 2 is a cross-sectioned view of part of the FIG. 1 missile and frame, and of a hook and hook cutting assembly used therein.
Figure 3:
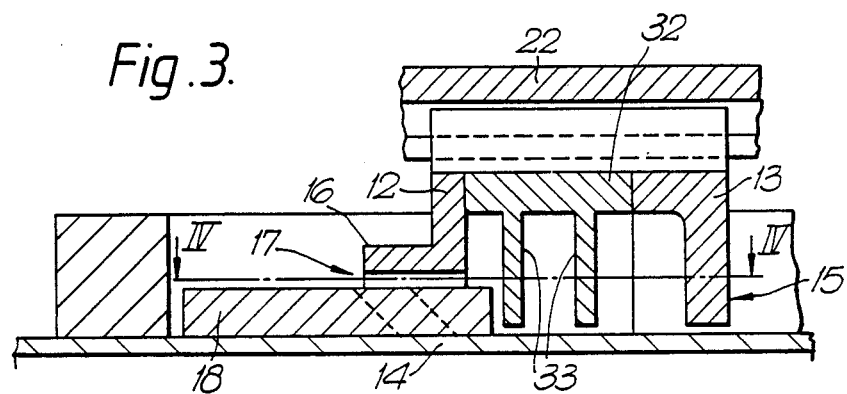
FIG. 3 is a sectional elevation corresponding to FIG. 2.
Figure 4:
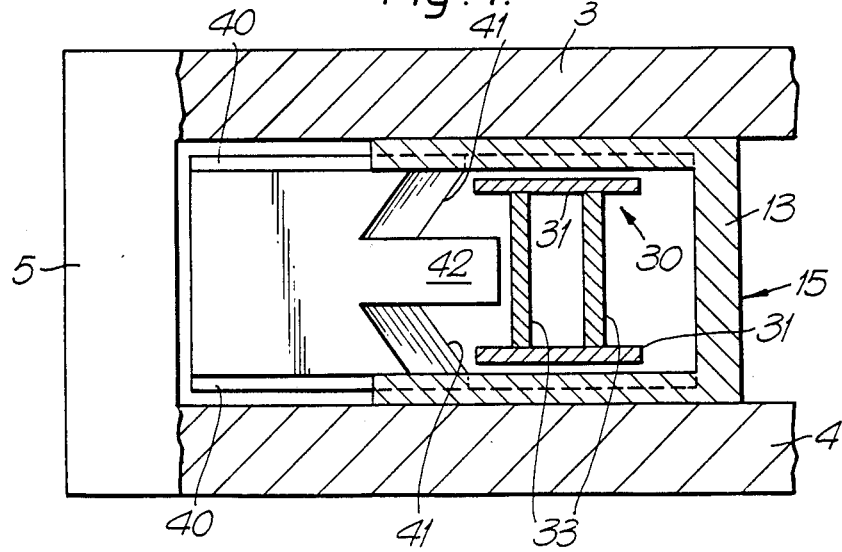
FIG. 4 is a section on line IV—IV in FIG. 3.

Referring to FIGS. 1 to 4 a missile 1 is supplied fitted with a rectangular auxiliary mounting frame 2 comprising two closely spaced elongate side portions 3 and 4 which extend parallel to one another along the length of the missile, and front and rear bridging portions 5 and 6 respectively. To the top surface of the missile 1 are fixed three hook and hook cutter assemblies 7. Each assembly 7 comprises a hook body 8 having side walls 9, each with two outwardly extending flanges 10 and 11, and having front and rear end walls 12 and 13. The rear end wall 13 extends down to the near missile body skin 14 to define, at its rear, an anvil or stop surface 15 of which the purposes will be described later. The front end wall 12 extends down towards the missile skin and merges with a forwardly extending portion 16 of the hook body defining an aperture 17 for receiving a ram and cutter member 18, the member 18 being slidably mounted in slots 19 formed in the side walls 9. The lowermost flanges 10 of the side walls are slidably engaged in respective full-length slots 20 provided in the inwardly facing sides of the elongate portions 3 and 4 of the frame 2. The uppermost flanges 11 of the side walls 9 lie above the frame portions 3 and 4 and above the tops of the hook body end walls 12 and 13 so that they may be engaged with a rail 22 forming part of a standard missile launcher assembly attached to an aircraft (not shown). As shown in FIG. 1, the three hooks formed by the assemblies 7 have different lengths (in the direction of the missile fore and aft axis), the rearmost hook being longest, the front hook being shortest and the central hook having an in-between length. The object of this is to allow the missile to be fitted to the launcher rail 22 without having to be slid right along the length thereof—instead, the rail is provided with openings (not shown) leading upwards into the slide surfaces of the rail and having respective lengths matched to those of the hooks. The missile can thus be fitted by having its hooks moved up through the rail openings and then slid only a short distance forward onto the rail slider surfaces. Then during launch, because the rear hook is longer than the openings for the other hooks, it will not drop through either of those openings as it passes over them. Similarly, the centre hook will not drop through the opening for the front hook. The auxiliary mounting frame 2 is locked to the missile launcher assembly by any suitable means (not shown), say by means of a spring detent mechanism positioned somewhere within the rearmost half of the frame 2 and operable to engage appropriate recesses or the like defined by the standard launcher assembly. Thus, when the missile is launched, the frame 2 remains fixed, the lower flanges 10 of the hook bodies sliding along within the slots 20 of the frame 2 while the flanges 11 slide along the launcher rail 22.

The hook body 8 of each assembly 7 is fixed to the missile 1 by way of a hollow box member 30 which comprises two spaced flanges 31 each fixed to or integral with the missile skin 14 and each extending up within the hook body closely adjacent the inward surfaces of respective ones of the hook body side walls 9. The upper ends of the flanges 31 are about level with the tops of the hook body end walls 12 and 13 and are joined together here by a rectangular plate 32 having two downwardly extending webs 33 which extend across between and are in contact with the flanges 31. The webs 33 extend down to, or to very near to, the missile skin but are not fixed to it. Also, the webs 33 while they are in contact with the flanges 31 are not fixed to those flanges or, if it is preferred (with a view to providing resistance to lateral vibration), the webs may be fixed to the flanges but only relatively weakly, say by way of a tack weld and/or a low strength jointing compound or the like. The box member 30 formed by the plate 32, its webs 33, and the flanges 31 is fixed to the hook body 8 in the region of the top of the box member, i.e. near plate 32, by welding for example. The box member 30 and the hook body 8 could be made of stainless steel. As noted earlier, each assembly 7 also comprises a ram and cutter member 18 which, as seen best in FIG. 4, comprises a rectangular plate of which the side edges are provided with outwardly projecting slide portions 40 for engaging the slots 19 in side walls 9, and of which the rear end is ground to form two knife blade edges 41 at respective sides of a central ram portion 42. The edges 41 lie in front of the end of the ram portion 42 and each is angled so that, moving outwardly away from the ram portion 42 towards the side edge of the member 18, the edge becomes further from the front end of the member 18. Prior to launch of the missile, the front end of member 18 protrudes well forward of the hook body 8.

When the missile is launched, it moves forward relative to the mounting frame 2 and the missile launch assembly until the front end of the ram and cutter member 18 of the front hook and hook cutting assembly 7 reaches the front end stop formed by the front bridging portion 5 of frame 2. The missile continues forward of course and, as a result, the ram and cutter member 18 of the front assembly 7 is pushed back relative to the hook body. Then, as shown in FIG. 5, the ram portion 42 of member 18 contacts the front web 33 and bends it backwards while the knife blade edges 41 start to shear through the flanges 31 (as shown in FIG. 6). The shearing continues while the ram portion 42 reaches and bends back the rear web 33 as shown in FIG. 7. Eventually the flanges 31 are cut through completely so detaching the box member 30, the member 18 and the hook body 8 from the missile. Whilst the flanges 31 are being cut through, they are also bent inwards by the angled and bevelled surfaces leading to the knife edges, the progressive bending back of the webs 33 permitting this.

The missile, now secured to the frame and launcher assembly rail 22 by the two rear hooks only, continues on until the front of the ram and cutter member of the central hook assembly 7 reaches the anvil face formed by the rear end wall 13 of the front assembly 7. As a result, the central hook assembly is sheared from the missile in the same way as described above. Finally the rear hook assembly reaches the anvil face of the central hook assembly and this rear hook assembly is also sheared off leaving the missile free to fly on from the aircraft. As described above the sequence of events is in 'slow motion' as it were but it will of course be realised that it all happens very quickly. On firing, the missile shoots forward and the respective members 18 are rammed back to chop through the respective box members with substantial force. The term rammed back is used in a relative sense of course because, in fact, they are stopped while the missile and the hooks move forward.

Figure 8:
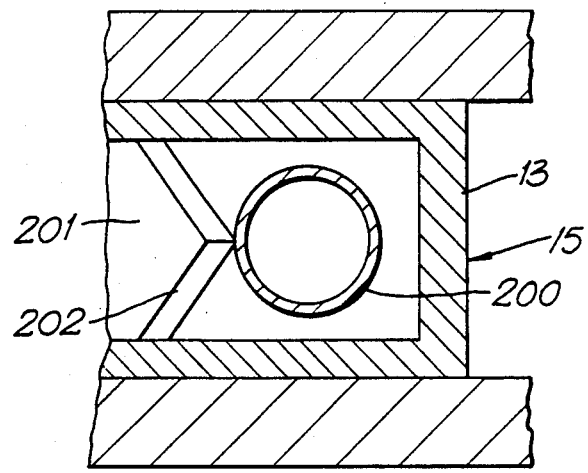
FIGS. 8, 9, 10 and 11 are scrap-views illustrating respective modifications which can be made to the hook and hook cutting assembly of FIGS. 1 to 4; and, FIGS. 12 and 13 respectively a section on XII—XII in FIG. 12 and a section on XIII—XIII in FIG. 13 of part of a second embodiment of a missile launcher and subframe.

The use of a box member 30 as shown with the webs 33 contacting but at least not strongly attached to the flanges 31 and the only flanges attached to the missile and the use of a ramming and cutting member with knife edges shaped as shown is all preferred in order to provide desired strength of attachment of the missile to the launcher assembly while ensuring proper severing of the hooks from the missile during launch. However, the particular arrangement shown could be modified or re-designed if required. For example as shown in FIG. 8, it may be possible to replace the box member 30 with a thin-walled cylindrical tube 200 and the member 18 by a member 201 having a triangularly pointed knife edge 202 at its rear end.

Figure 9:
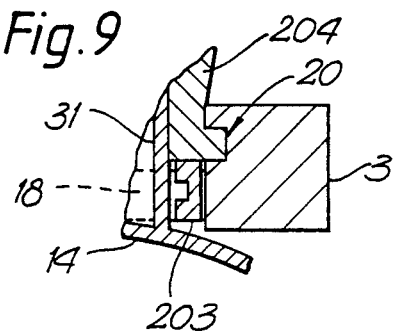
Figure 10:
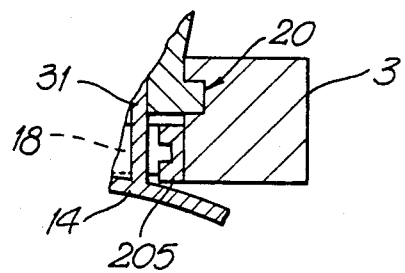
Figure 11:
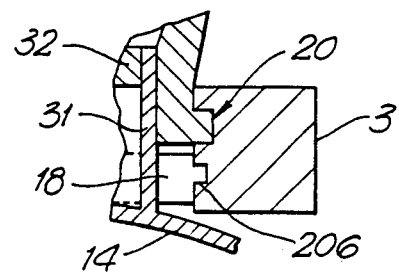

Instead of the ramming and cutting member 18 being mounted in slide grooves formed in the side walls of hook body 8, these slide grooves could be provided in strips 203 fixed to the hook body 204 but not integral therewith as shown in FIG. 9 or in strips 205 fixed to and extending right along the slide portions 3 and 4 of the frame 2 as shown in FIG. 10, or slide grooves 206 could be provided in the portions 3 and 4 themselves.

In the embodiment shown in FIGS. 12 and 13, at each slide hook position, a curved plate 80 is fitted to the top surface of the missile 81, the two ends of the plate 80 having upstanding portions 82. From the middle of the plate 80, two relatively thin flanges 83 extend up and are connected to the head 84 of an inverted bolt having a spigot portion 85 extending through a hole in a hook member 86. A nut 87 and washer 88 are engaged on the threaded end of spigot portion 85 and are tightened down onto the hook body member 86. The hook body member comprises two laterally extending slideway engaging portions 89 engaged in the slide grooves 90 of a launcher slide rail 91, two laterally inwardly extending grooves 92 engaged on slide rails 93 incorporated in a sub-frame 94 similar to the sub-frame 2 of FIG. 1, and two fillet portions 95 which extend down to the plate 80 and laterally outwardly into engagement with the abutments formed by the upstanding portions 82 of plate 80. An internal space 96 is provided in the hook member and there, engaged in grooves 97, is a knife member 98 having a triangular pointed knife edge 99 facing the flanges 83. At that end of the hook member opposite the knife member, an anvil face is defined by a cross-member 100. As the missile is launched and the forward end 101 of the knife member 98 hits the end of the sub-frame 94 or the anvil face defined by the next forward hook member, the knife edge 99 slices through flanges 83, complete severance being assured by the knife edge point being able to enter gap 102 in cross-member 100. The plate 80 with the short lower stubs of the flanges 83 remain fixed to the missile. Before launch, any side loads acting on the missile are taken up by the engagement of the portions 95 of the hook member with the portions 82 of plate 80. Thus the attachment means between the missile and hook member can comprise just the flanges 83—no distortion preventing webs such as the webs 33 in FIGS. 1 to 7 are necessary. In addition, because the hook member 86 is fixed to the missile by means of the nut 87, the hook member 86 can be removed and replaced if, during repeated installation and removal from the launcher, its slideway engaging portions 89 become damaged.

I claim:

1. A missile having at least one hook attached to the missile body and operable for engaging a slide rail forming part of a launch station for the missile, cutter knife means positioned in front of the hook and movable relative to the missile towards said hook and abutment means for engaging said cutter knife means as the missile is launched and for causing the cutter knife means to forcibly engage and sever the hook from the missile at a position adjacent the missile body.

2. In combination, a missile having one or more upstanding slide hooks for enabling the missile to be mounted to a launch station, and an elongate sub-frame to which the missile is attached with said hook(s) extending through the sub-frame, which along with the missile can be mounted to said launch station, and which incorporates cutting means positioned for severing said hook(s) as the missile is launched.

3. In combination, a missile and missile mounting assembling comprising:
a missile body;
an elongate sub-frame including two side members having respective inwardly facing portions defining a slideway;
a plurality of upstanding slide hooks spaced along the missile body and each extending through said sub-frame between the two side members thereof, the slide hooks comprising respective attachment portions by which the hooks are fixed to the missile body, respective first slideway engaging portions slidably engaged with the slideway defined by said inwardly facing portions of the sub-frame side members, and respective second slideway engaging portions for being engaged with a slideway forming part of a launch station for the missile; and
for each slide hook, a blade member mounted in front of the attachment portion of the respective associated hook for movement relative to that hook towards the attachment portion thereof, each blade member being formed with a knife edge facing the respective attachment portion;
a front portion of said elongate sub-frame defining an abutment surface for engaging and halting movement of the blade member associated with the foremost slide hook as the missile moves forward along said slideways during its launch and for thereby causing the attachment portion of the foremost slide hook to be severed by the knife edge of said blade member, and a rear portion of each slide hook defining an abutment surface for engaging and halting movement of the blade member associated with the next following slide hook for causing likewise the severing of the attachment portion of that next following slide hook.

4. A combination according to claim 3, wherein each attachment portion comprises a box member formed by two laterally spaced flanges fixed to the missile body and upstanding therefrom in planes parallel one to another and to the forward direction of movement of the missile during its launch, a rectangular plate extending between and having respective ones of two opposite edges fixed to the upper ends of said flanges, and two webs fixed to respective ones of the other two opposite edges of the plate member and extending down, between the flanges, to at least near the missile body without being fixed thereto, the side edges of said webs being in contact with the inwardly facing sides of the flanges so as to stiffen the flanges against lateral bending moments but being at least only weakly attached to said flanges, and wherein each blade member comprises, facing the respective attachment portion, a ram portion for engaging said webs and bending them up away from the missile body and two knife edge portions for engaging respective ones of said flanges and shearing through them.

5. A combination according to claim 3, wherein each attachment portion comprises two laterally spaced flanges fixed to the missile body and upstanding therefrom in planes parallel one to another and to the forward direction of movement of the missile during its launch and wherein said slide hooks comprise respective side-load resisting portions extending to at least close to the missile body and into engagement between laterally spaced upstanding abutments which are fixed to the missile body and through which any side-loads acting on the missile body are transmitted to said side-load resisting portions of the slide hooks.

6. A combination according to claim 3, wherein each slide hook comprises portions defining a slideway wherein said blade member is mounted for initial movement with the slide hook and then, when the blade member is halted by engagement with a said abutment surface, for relative sliding movement of the blade member and slide hook to take place.

7. A combination according to claim 3, wherein each slide hook comprises a body member incorporating said slideway engaging portions and said abutment surface defining rear portion, the slide hook further comprising disengageable connector means by which the attachment portions of the slide hook are connected to the body member.

8. A combination according to claim 7, wherein said disengageable connector means comprises a screw threaded spigot member fixed to said attachment portions and extending through a hole in the body member, and a nut screwed onto the spigot member and engaging said body member.

9. A combination according to claim 3, wherein each attachment portion of each slide hook comprises a curved plate fitted to the missile, the plate including two upstanding portions extending along the missile body, and two laterally spaced flanges fixed to the vortex region of the plate and upstanding therefrom in planes parallel one to another and to the forward direction of movement of the missile during its launch; said flanges being connected to the slideway engaging portions of the slide hook by disengageable connecting means; the slide hook being engaged between said two upstanding portions of the plate for providing resistance to side loads, and the slide hook comprising a blade member housing region wherein said blade member is mounted.

10. A combination according to claim 9 wherein said disengageable connecting means comprises a nut and bolt assembly.

* * * * *